(12) United States Patent
Ma et al.

(10) Patent No.: US 8,018,975 B2
(45) Date of Patent: Sep. 13, 2011

(54) METHOD AND SYSTEM FOR PERFORMING SYNCHRONIZATION IN OFDM SYSTEMS

(75) Inventors: Jianglei Ma, Kanata (CA); Ming Jia, Ottawa (CA); Peiying Zhu, Kanata (CA); Wen Tong, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1191 days.

(21) Appl. No.: 11/529,245

(22) Filed: Oct. 2, 2006

(65) Prior Publication Data

US 2007/0025236 A1 Feb. 1, 2007

Related U.S. Application Data

(62) Division of application No. 10/038,915, filed on Jan. 8, 2002, now Pat. No. 7,548,506.

(60) Provisional application No. 60/329,507, filed on Oct. 17, 2001, provisional application No. 60/329,510, filed on Oct. 17, 2001, provisional application No. 60/329,514, filed on Oct. 17, 2001.

(51) Int. Cl.
*H04J 3/06* (2006.01)
(52) U.S. Cl. .......................... 370/509; 370/208; 370/503
(58) Field of Classification Search .................. 370/208, 370/503, 509
See application file for complete search history.

(56) References Cited

U.S. PATENT DOCUMENTS

| | | | |
|---|---|---|---|
| 5,596,582 A | 1/1997 | Sato et al. | |
| 5,726,978 A | 3/1998 | Frodigh et al. | |
| 5,818,813 A | 10/1998 | Saito et al. | |
| 5,867,478 A | 2/1999 | Baum et al. | |
| 6,038,450 A | 3/2000 | Brink et al. | |
| 6,430,148 B1 | 8/2002 | Ring | |
| 6,473,467 B1 | 10/2002 | Wallace et al. | |
| 6,731,624 B1 | 5/2004 | Maekawa et al. | |
| 6,904,283 B2 | 6/2005 | Li et al. | |
| 6,959,050 B2 | 10/2005 | Baum et al. | |
| 6,961,364 B1 | 11/2005 | Laroia et al. | |
| 7,009,931 B2 * | 3/2006 | Ma et al. | 370/208 |
| 7,027,429 B2 | 4/2006 | Laroia et al. | |
| 7,088,782 B2 | 8/2006 | Mody et al. | |
| 7,088,787 B2 | 8/2006 | Wang et al. | |
| 7,269,127 B2 * | 9/2007 | Mody et al. | 370/210 |

(Continued)

FOREIGN PATENT DOCUMENTS

EP 0 762 701 A2 3/1997

(Continued)

OTHER PUBLICATIONS

Van Bosse: "Signalling in Telecommunication Networks" 1998, John Wiley & Sons, New York, pp. 356-358.

(Continued)

*Primary Examiner* — Jason Mattis

(57) ABSTRACT

A method and apparatus are provided for performing acquisition, synchronization and cell selection within an MIMO-OFDM communication system. A coarse synchronization is performed to determine a searching window. A fine synchronization is then performed by measuring correlations between subsets of signal samples, whose first signal sample lies within the searching window, and known values. The correlations are performed in the frequency domain of the received signal. In a multiple-output OFDM system, each antenna of the OFDM transmitter has a unique known value. The known value is transmitted as pairs of consecutive pilot symbols, each pair of pilot symbols being transmitted at the same subset of sub-carrier frequencies within the OFDM frame.

24 Claims, 10 Drawing Sheets

U.S. PATENT DOCUMENTS

| | | | |
|---|---|---|---|
| 7,406,104 | B2 | 7/2008 | Yang et al. |
| 2001/0031639 | A1 | 10/2001 | Makipaa |
| 2002/0041635 | A1 | 4/2002 | Ma et al. |
| 2002/0080887 | A1 | 6/2002 | Jeong et al. |
| 2002/0122381 | A1 | 9/2002 | Wu et al. |
| 2002/0122382 | A1 | 9/2002 | Ma et al. |
| 2003/0002471 | A1 | 1/2003 | Crawford et al. |
| 2003/0072397 | A1 | 4/2003 | Kim et al. |
| 2005/0171995 | A1 | 8/2005 | Grindahl et al. |
| 2009/0060076 | A1 | 3/2009 | Ma et al. |

FOREIGN PATENT DOCUMENTS

| | | |
|---|---|---|
| EP | 0 869 647 A2 | 10/1998 |
| EP | 0 929 172 A1 | 7/1999 |
| EP | 1 096 822 | 10/2000 |
| EP | 1 096 822 A | 5/2001 |
| EP | 1 185 001 | 8/2001 |
| EP | 1 185 048 | 8/2001 |
| EP | 1 185 001 A | 3/2002 |
| EP | 1 185 048 A | 3/2002 |
| GB | 2320871 | 12/1997 |
| GB | 2 320 871 A | 7/1998 |
| KR | 1999-022492 | 3/1999 |
| KR | 2000-74825 | 12/2000 |
| KR | 2000-0076921 | 12/2000 |
| KR | 2001-0077186 | 8/2001 |
| WO | WO 98/37654 | 2/1998 |
| WO | 98/19410 A | 5/1998 |
| WO | WO 98/19410 | 5/1998 |
| WO | 98/37654 A | 8/1998 |
| WO | WO 99/01956 | 1/1999 |
| WO | 01/76110 A | 10/2001 |
| WO | WO 01/76110 | 10/2001 |
| WO | 02/17615 A | 2/2002 |
| WO | WO 02/17615 | 2/2002 |
| WO | 02/45333 A1 | 6/2002 |

OTHER PUBLICATIONS

I. Barhumi, G. Leus and M. Moonen, Optimal Training Sequences for Channel Estimation in MIMO OFDM Systems in Mobile Wireless Channels, Feb. 19, 2002, pp. 1-6.
Suhas Diggavi, Naofal Al-Dhahir, Anastasios Stamoulis, Intercarrier Interface in MIMO OFDM, Apr. 28, 2002, pp. 485-489.
Czylwik, Andreas; Synchronization for Systems With Antenna Diversity; IEEE, 1999, pp. 728-732.
Tufvesson, Fredrik; Edfors, Ove, Faulkner, Mike; Time and Frequency Synchronization for OFDM Using PN-Sequence Preambles; IEEE; 1999; pp. 2203-2207.
Müller-Weinfurtner, Stefan H.; Frequency-Domain Frame Synchronization for Optimum Frequency-Differential Demodulation of OFDM; Global Telecommunications Conference—Globecom 1999; IEEE; pp. 857-862.
Zhang, Yingjun; Letaief, K.B.; Multiuser Subcarrier and Bit Allocation Along With Adaptive Cell Selection for OFDM Transmission; IEEE, 2002; pp. 861-865.
Henry, James; Kori, M.H.; Dect Based Rural Radio Local Loop for Developing Countries; IEEE; 1996; pp. 44-46.
Li, Jungson; Faravash, Shayan; Kavehrad, Mohsen; Dynamic Time-Division-Duplex Wireless Local Loop; IEEE; 2000, pp. 1078-1085.
Vogiatzis, N.; Sanchez-P, J.A.; An Adaptive Multicarrier Wireless Access System; IEEE; 2000, pp. 298-303.
Bakker, J.D.; Schoute, F.C.; Prasad, R.; An Air Interface for High Bandwidth Cellular Digital Communications on Microwave Frequencies; IEEE, May 18, 1998, pp. 132-138.
Chuang, J.C-I; Sollenberger, N. R.; Cimini, L.J.; Power Control for Dynamic Packet Assignment; IEEE; May 18, 1998, pp. 1750-1754.
Kipo's Notice of Preliminary Rejection (including English translation), Korean Application No. 10-2009-7013186, 7 pages total, dated Sep. 19, 2009.
English Abstract of Korean Patent Application No. 10200 00074825, 2 pages total (corresponding to Korean Patent Document No. 2000-74825 listed above in the Foreign Patent Documents section.).
Müller-Weinfurtner, "Frequency-domain frame synchronization for optimum frequency-differential demodulation of OFDM", IEEE Global Telecommunications Conference, Dec. 5, 1999, pp. 857-862.
Tufvesson et al., "Time and frequency synchronization for OFDM using PN-sequence preambles", IEEE Vehicular Technology Conference, Sep. 19, 1999, pp. 2203-2207.
Czylwik, "Synchronization for systems with antenna diversity", IEEE Vehicular Technology Conference, Sep. 19, 1999, pp. 728-732.
Henry et al., "DECT based rural radio local loop for developing countries", IEEE Conference on Personal Wireless Communications, Feb. 19, 1996, pp. 44-46.
Yingjun, Zhang et al., "Multiuser subcarrier and bit allocation along with adaptive cell selection for OFDM transmission", IEEE International Conference on Communications, Apr. 28, 2002, pp. 861-865.
European Search Report for corresponding European Patent Application No. 10158841 dated May 19, 2010.
Bakker et al., "An air interface for high bandwidth cellular digital communications on microwave frequencies", IEEE Vehicular Technology Conference, May 18, 1998, pp. 132-138.
Chuang et al., "Power control for dynamic packet assignment in advanced cellular internet service", IEEE Vehicular Technology Conference, May 18, 1998, pp. 1750-1754.
Vogiatzis, Sanchez-P, "An adaptive multicarrier wireless access system", IEEE Conference on Wireless Communications and Networking, Sep. 23, 2000, pp. 298-303.
Li et al., "Dynamic time-division-duplex wireless local loop", IEEE Vehicular Technology Conference, Sep. 24, 2000, pp. 1078-1085.
Barhumi et al., "Optimal training sequences for channel estimation in MIMO OFDM systems in mobile wireless channels", International Zurich Seminar on Broadband Communications, Feb. 19, 2002.
European Search Report for corresponding European Patent Application No. 10161508 dated May 21, 2010.
European Search Report for corresponding European Patent Application No. 10161516 dated May 26, 2010.
Mueller-Weinfurtner, S. H., "On the Optimality of Metrics for Coarse Frame Synchronization in OFDM: A comparison", IEEE International Symposium on Personal, Indoor and Mobile Radio Communications, vol. 2, Sep. 8, 1998, pp. 533-537.
Mueller-Weinfurtner, S. H. Ed., "Institute of Electrical and Electronics Engineers: Comparison of Preamble Structures for Burst Frequency Synchronization", Globecom'00, vol. 3, Nov. 27, 2000, pp. 1488-1493.
Almenar V. et al., "Synchronization techiques for HIPERLAN/2", IEEE 54th Vehicular Technology Conference, vol. 2, Oct. 7, 2001, pp. 762-766.
European Search Report for corresponding European Patent Application No. 10183138, date of completion: Nov. 29, 2010, 3 pages.
European Search Report for corresponding European Patent Application No. 10183133.7, date of completion: Dec. 3, 2010, 8 pages.
European Written Opinion for corresponding European Patent Application No. 10183138.6, date of completion: Nov. 29, 2010, 4 pages.
Kipo's Notice of Preliminary Rejection (including English translation), Korean Application No. 10-2010-7024290, dated Jan. 21, 2011, 5 pages in total.
Kipo's Notice of Preliminary Rejection (including English translation), Korean Application No. 10-2010-7024291, dated Jan. 21, 2011, 5 pages in total.
Kipo's Notice of Preliminary Rejection (including English translation), Korean Application No. 10-2010-7029478, dated Feb. 17, 2011, 4 pages in total.
Office Action for U.S. Appl. No. 12/269,432 including Notice of References Cited, dated Apr. 5, 2011, 7 pages.

* cited by examiner

METHOD AND SYSTEM FOR PERFORMING SYNCHRONIZATION IN OFDM SYSTEMS

RELATED APPLICATIONS

This application is a divisional application of U.S. application Ser. No. 10/038,915 filed Jan. 8, 2002 now U.S. Pat. No. 7,548,506. This application claims the benefit of U.S. Provisional Application Nos. 60/329,507, 60/329,510 and 60/329,514 all filed Oct. 17, 2001.

FIELD OF THE INVENTION

This invention relates to cellular wireless communication systems, and more particularly to system access within cellular wireless communication systems employing OFDM or OFDM-like technology, and to physical layer packet and preamble designs.

BACKGROUND OF THE INVENTION

In a wireless communication system having at least one transmitter and at least one receiver, the receiver must acquire the timing of a signal transmitted by the transmitter and synchronize to it before information can be extracted from the received signal. The timing of signals transmitted from a base station, within a wireless communication system, is commonly referred to as the system timing.

In cellular wireless communication systems employing Orthogonal Frequency Division Multiplexing (OFDM), synchronization to the timing of a signal enables the exact positioning of a Fast Fourier transform (FFT) window utilised by a receiver of the signal to extract information from the signal.

In any cellular wireless communication system having multiple base stations (BTS) and multiple mobile communication devices the synchronization process must occur frequently between the BTS and the mobile communication devices for the system to be operable. The mobile communication devices will simply be referred to as hereinafter as UE (user equipment).

Furthermore, each BTS defines a geographic transmission region, known commonly as a cell, in which UE in substantially close proximity to a particular BTS will access the wireless communication system. The process whereby a particular UE selects a BTS from which to access the cellular wireless communication system is known as cell selection. In order to optimize the reception of the BTS signal, the UE needs to identify the best quality signal received from different BTSs and switch its receiver to tune into the best BTS for a given time. Thus, due to the mobility of UE, the synchronization process has to be employed frequently in order to allow seamless handoffs from one BTS to another BTS as the UE changes location.

In most current cellular wireless communication systems, fast system access and cell selection are essential functions for proper mobile UE operation. The objective of fast acquisition is to allow UE to synchronize into the desired BTS. The cell selection and re-selection is performed by UE to synchronize and measure the signal (including the interference) power among the adjacent BTS and select and switch to the BTS with the best signal quality, namely the maximum C/I (carrier-to-interference) ratio.

Existing solutions to access a wireless communication system employing OFDM (Orthogonal Frequency Division Multiplexing) were designed for wireless LAN (local area network) systems for fast packet access under a SISO (single input-single output) configuration. However, the wireless LAN does not have the capability to deal with the UE mobility, which requires seamless BTS handoff. On the other hand some cellular systems e.g. 3G UMTS are capable of performing cell selection and BTS identification and BTS C/I ratio measurement.

Multiple Input Multiple Output-Orthogonal Frequency Division Multiplexing (MIMO-OFDM) is a novel highly spectral efficient technology used to transmit high-speed data through radio channels with fast fading both in frequency and in time. For a high-speed downlink packet data transmission system, the design of the physical layer packet structure is a fundamental aspect.

OFDM technology has been adopted by DAB, DVB-T and IEEE 802.11 standards. DAB and DVB-T are used for audio and video territorial broadcasting. In these systems, the signal is transmitted in a continuous data stream. A preamble is not needed because fast packet access is not critical. DAB and DVB-T are also applied in single frequency networks. In this case, every transmitter transmits the same signal as a simulcast. The interference from the neighbouring transmitters can be treated as an active echo, which can be handled by the proper design of the prefix. IEEE 802.11 is the wireless LAN standard. It is a packet based OFDM transmission system. A preamble header is introduced in this standard.

Synchronization within MIMO-OFDM (Multiple Input Multiple Output-OFDM) systems, in which each transmitter and each receiver have multiple antennae, is even more difficult. Adding to the complexity of the task is that a fast synchronization process must be very reliable at very low C/I ratio conditions to allow a high rate of success for the entire cell. In addition, high mobility causes a high Doppler spread and this makes reliable synchronization even more difficult.

In MIMO-OFDM systems, synchronization can be performed in two steps. First, frame synchronization (also called coarse synchronization) is performed in order to determine the approximate range of the location of the starting position of the first OFDM symbol in the frame. Second, timing synchronization (also called fine synchronization) is performed to determine the precise FFT window location, so that demodulation in the frequency domain can be performed accurately.

Conventionally, fine synchronization is implemented in time domain. This is achieved by inserting an a priori known pilot training sequence in the time domain for the receiver to perform the cross correlation computing at select time slots.

For example, as shown in FIGS. 1A and 1B, the OFDM frame structure of the IEEE 802.11 standard utilizes several repeated short OFDM symbols generally indicated at 5 arranged as several headers in the time domain at the beginning of the frame for select sub-carriers, followed by training OFDM symbols 207 for fine synchronization. The headers 5 are used for frame (i.e. coarse) synchronization. The training OFDM symbols 207 are used to position the FFT window precisely so that demodulation in the frequency domain can be performed accurately. The training OFDM symbols 207 are followed by a TPS OFDM symbol 205 and data OFDM symbols 30.

The TPS (transmission parameter signalling) OFDM symbol 205, shown more clearly in the frequency domain (see FIG. 1B), is transmitted with a frequency that corresponds to an adaptive coding and modulation period. The training OFDM symbols, TPS OFDM symbol and data OFDM symbols use all sub-carriers. In the 802.11 system, the repeated headers for coarse synchronization are only transmitted on every fourth sub-carrier. This design is only suitable for a simple SISO OFDM system with only a single transmit antenna. For MIMO-OFDM system the preamble design is more complicated because of the existence of multiple transmit antennas. Furthermore for mobile communications, an efficient preamble design is even more difficult because of the multi-cell environment, the requirement for initial access when no BTS information is available, BTS switching and even soft handoff.

Existing methods in the process of cell acquisition and synchronization employ a 3-step-synchronization approach adopted by UMTS WCDMA system, which requires a relatively long access time. While fine synchronization may be performed in the time domain, the self-interference of MIMO channels limits the performance of this approach under very low C/I conditions. Increasing the length of the correlation can enhance the performance of fine synchronization in the time domain but at the price of an increase in overhead and processing complexity. The existing designs are based on the time domain training sequence correlation for a single transmit antenna and a single receive antenna system. However, a straightforward extension of such a time domain synchronization approach will cause performance loss especially for low C/I ratio applications. The cause of the performance loss is the self-interference between the MIMO channels that is not easy to reduce in time domain.

SUMMARY OF THE INVENTION

One broad aspect of the invention provides a MIMO-OFDM transmitter adapted to transmit a header symbol format in which sub-carriers of a header OFDM symbol are divided into a non-contiguous set of sub-carriers for each of a plurality of antennas, with each antenna transmitting the header OFDM symbol only on the respective set of sub-carriers.

In some embodiments, there are N antennas and a different set of sub-carriers separated by N sub-carriers is assigned to each of the plurality of antennas.

In some embodiments, the header symbols contain a multiplexed dedicated pilot channel on dedicated pilot channel sub-carriers and common synchronization channel on common synchronization channel sub-carriers for each of the plurality of antennas.

In some embodiments, the header OFDM symbols further contain multiplexed broadcasting sub-carriers for each of the plurality of antennas.

In some embodiments, the transmitter is further adapted to transmit a preamble having a prefix, followed by two identical OFDM symbols having said header OFDM symbol format. In some embodiments, the prefix is a cyclic extension of the two identical OFDM symbols.

In some embodiments, the pilot channel has a BTS specific mapped complex sequence allowing efficient BTS identification.

In some embodiments, the common synchronization channel is designed for fast and accurate initial acquisition.

In some embodiments, the common synchronization channel is used for coarse synchronization and fine synchronization and the pilot channel is used for fine synchronization.

In some embodiments, the common synchronization channel is used to transmit a complex sequence which is different for each transmit antenna of one transmitter, but which is common for respective transmit antennas of different transmitters within a communications network.

In some embodiments, the transmitter is further adapted to transmit OFDM frames beginning with said preamble, and having scattered pilots throughout a remainder of the OFDM frame.

In some embodiments, during the preamble, for each of N transmit antennas, dedicated pilot channel sub-carriers are transmitted and common synchronization channel sub-carriers are transmitted and broadcasting channel sub-carriers are transmitted.

In some embodiments, the sub-carriers of the preamble OFDM symbols are organized as a repeating sequence of {dedicated pilot channel for each of N transmit antennas, common synchronization channel sub-carrier for each of N transmit antennas} arranged in a predetermined order.

In some embodiments, the sub-carriers of the preamble OFDM symbols are organized as a repeating sequence of {at least one dedicated pilot channel sub-carrier for each of N transmit antennas, at least one common synchronization channel sub-carrier for each of N transmit antennas, at least one broadcast channel sub-carrier} arranged in a predetermined order.

Another broad aspect of the invention provides a MIMO-OFDM receiver adapted to receive a header symbol format in which sub-carriers of a header OFDM symbol are divided into a non-contiguous set of sub-carriers for each of a plurality of antennas, with each antenna transmitting the header OFDM symbol only on the respective set of sub-carriers.

In some embodiments, the receiver is adapted to receive from N transmit antennas with a different set of sub-carriers separated by N sub-carriers assigned to each of the plurality of transmit antennas.

In some embodiments, the receiver is further adapted to perform fine synchronization on the basis of the common synchronization channel sub-carriers and/or the dedicated pilot channel sub-carriers.

Another broad aspect of the invention provides a transmitter adapted to transmit a packet data frame structure. The packet data frame structure has a superframe having a length corresponding to a synchronization period of a network; the superframe containing a plurality of radio frames; each radio frame containing a plurality of TPS (transmission parameter signalling) frames corresponding to an adaptive coding and modulation period; each TPS frame containing a plurality of slots corresponding to an air interface slot size; each slot containing a plurality of OFDM symbols, with the first two symbols of the first slot of the first TPS frame of each OFDM frame being used as header OFDM symbols.

In some embodiments, the header OFDM symbols have a header OFDM symbol format in which sub-carriers of a header OFDM symbol are divided into a non-contiguous set of sub-carriers for each of a plurality of antennas, with each antenna transmitting the header OFDM symbol only on the respective set of sub-carriers.

In some embodiments, the header OFDM symbols contain multiplexed pilot channel sub-carriers and common synchronization channel sub-carriers for each of the plurality of antennas.

In some embodiments, the header OFDM symbols further contain multiplexed broadcasting channel sub-carriers for each of the plurality of antennas.

In some embodiments, the transmitter is further adapted to transmit in a plurality of different modes by transmitting a different number of OFDM symbols per slot with an unchanged slot duration and with no change to the frame structure above the slot.

In some embodiments, wherein modes with an increased number of OFDM symbols per slot are realized by shortening OFDM symbol duration, and shortening FFT size, but not changing sampling frequency.

In some embodiments, the transmitter is further adapted to transmit to a respective set of users for each TPS frame and to signal for each TPS frame which users should demodulate the entire TPS frame.

Another broad aspect of the invention provides a method of performing synchronization at an OFDM receiver. The method involves, at each of at least one receive antenna, sampling a received signal to produce a respective set of time domain samples; determining at least one coarse synchronization position; at each of the at least one receive antenna:

a) for each of a plurality of candidate fine synchronization positions about one of said at least one coarse synchronization position:

i) for each receive antenna positioning an FFT window to the candidate fine synchronization position and converting by FFT the time domain samples into a respective set of frequency domain components;

ii) for each said at least one transmit antenna, extracting a respective received training sequence corresponding to the transmit antenna from the sets of frequency domain components;

iii) for each transmit antenna, calculating a correlation between each respective received training sequence and a respective known transmit training sequence;

iv) combining the correlations for the at least one transmit antennas to produce an overall correlation result for each candidate synchronization position;

b) determining a fine synchronization position from the plurality of correlation values;

combining the fine synchronization positions from the at least one receive antenna in an overall fine synchronization position.

In some embodiments, a coarse synchronization position is determined for each receive antenna and used for determining the respective fine synchronization position.

In some embodiments, a coarse synchronization position is determined for each receive antenna and an earliest of the positions is used determining the fine synchronization positions for all receive antennas.

In some embodiments, the coarse synchronization position is determined in the time domain for at least one receive antenna by looking for a correlation peak between the time domain samples over two OFDM symbol durations.

In some embodiments, the method is applied at an OFDM receiver having at least two antennas, and combining the fine synchronization positions from the at least one receive antenna in an overall fine synchronization position comprises selecting an earliest of the fine synchronization positions.

In some embodiments, sampling a received signal to produce a set of time domain samples is done for at least three OFDM symbol durations; determining at least one coarse synchronization position comprises performing a coarse synchronization in the time domain by looking for a correlation peak between the time domain samples received over two OFDM symbol durations to identify a coarse synchronization position by:

a) calculating a plurality of correlation values, each correlation value being a correlation calculated between a first set of time domain samples received during a first period having one OFDM symbol duration and a second set of time domain samples received during a second period immediately following the first period and having OFDM symbol duration, for each of a plurality of starting times for said first period;

b) identifying the coarse synchronization position to be a maximum in said plurality of correlation values.

Another broad aspect of the invention provides an OFDM receiver having at least one receive antenna; for each said at least one receive antenna, receive circuitry adapted to sample a received signal to produce a respective set of time domain samples; a coarse synchronizer adapted to determine at least one coarse synchronization position; a fine synchronizer comprising at least one FFT, at least one correlator and at least one combiner, adapted to, at each of the at least one receive antenna:

a) for each of a plurality of candidate fine synchronization positions about one of said at least one coarse synchronization position:

i) for each receive antenna position an FFT window to the candidate fine synchronization position and convert by FFT the time domain samples into a respective set of frequency domain components;

ii) for each said at least one transmit antenna, extract a respective received training sequence corresponding to the transmit antenna from the sets of frequency domain components;

iii) for each transmit antenna, calculate a correlation between each respective received training sequence and a respective known transmit training sequence;

iv) combine the correlations for the at least one transmit antennas to produce an overall correlation result for each candidate synchronization position;

b) determine a fine synchronization position from the plurality of correlation values;

the receiver being further adapted to combine the fine synchronization positions from the at least one receive antenna in an overall fine synchronization position.

In some embodiments, the receiver has at least two receive antennas, and is adapted to combine the fine synchronization positions from the at least one receive antenna in an overall fine synchronization position by selecting an earliest of the fine synchronization positions.

In some embodiments, the receiver is adapted to combine the correlations for the at least one transmit antennas to produce an overall correlation result for each candidate synchronization position by multiplying together the correlations for the at least one transmit antenna for each candidate synchronization position.

In some embodiments, the receiver is adapted to receive the training sequence on common synchronization channel sub-carriers.

In some embodiments, the receiver is adapted to receive the training sequence on dedicated pilot channel sub-carriers.

Another broad aspect of the invention provides a method of performing fine synchronization. The method involves, at each at least one receive antenna receiving OFDM symbols containing a respective received frequency domain training sequence for each of at least one transmit antenna; performing fine synchronization in the frequency domain by looking for maximum correlations between known frequency domain training sequences and the received frequency domain training sequences.

Another broad aspect of the invention provides a method of transmitting signals enabling fine synchronization. The method involves from each of at least one transmit antenna, transmitting OFDM symbols containing a respective frequency domain training sequence.

In some embodiments, a different frequency domain training sequence is transmitted by each transmit antenna, but the same frequency domain training sequence is transmitted by corresponding antenna of other transmitters.

Another broad aspect of the invention provides a method of performing cell selection at an OFDM receiver. The method involves at each of at least one receive antenna, sampling a received signal to produce a respective set of time domain samples; determining at least one coarse synchronization position; at each of the at least one receive antenna:

a) performing a frequency domain correlation between at least one received common synchronization sequence extracted from common synchronization channel sub-carriers in the received signal and a corresponding common synchronization sequence of a respective plurality of transmit antennas to identify a plurality of candidate correlation peaks;

b) selecting the M strongest correlation peaks for further processing;

c) at each correlation peak, reconverting time domain samples into frequency domain components and processing pilot channel sub-carriers, these containing transmitter specific information, to identify a transmitter associated with each correlation peak;

d) determining a C/I or similar value for each transmitter thus identified; selecting the transmitter having the largest C/I determined for any of the at least one receive antenna.

In some embodiments, performing a frequency domain correlation between at least one received common synchronization sequence extracted from common synchronization channel sub-carriers in the received signal and a corresponding common synchronization sequence of a respective plurality of transmit antennas to identify a plurality of candidate correlation peaks comprises:

a) for each of a plurality of candidate fine synchronization positions about one of said at least one coarse synchronization position:
  i) for each receive antenna positioning an FFT window to the candidate fine synchronization position and converting by FFT the time domain samples into a respective set of frequency domain components;
  ii) for each of at least one common synchronization sequence, each common synchronization sequence having been transmitted by a transmit antenna of each of at least one transmitter, extracting a respective received training sequence corresponding to the transmit antennas from the sets of frequency domain components;
  iii) for each of the at least one common synchronization sequence, calculating a correlation between each respective received common synchronization sequence and a respective known common synchronization sequence;
  iv) combining the correlations to produce an overall correlation result for each candidate synchronization position;

b) determining at least one peak in the correlations, each said at least one peak being local maxima in the correlations.

In some embodiments, the method further involves reconverting time domain samples into frequency domain components based on the fine synchronization position of the selected transmitter and performing a further fine synchronization based on a dedicated pilot channel for that transmitter.

In some embodiments, the method is applied to a MIMO-OFDM frame format having a header symbol format in which subcarriers of a header symbol are divided into a non-contiguous set of subcarriers for each of a plurality of antennas, with each antenna transmitting header symbols only on the respective set of sub-carriers, and wherein the header symbols contain multiplexed pilot channel sub-carriers and common synchronization channel sub-carriers for each of the plurality of antennas, the frame beginning with two identical header OFDM symbols during which contents of the pilot channel sub-carriers are repeated and contents of the synchronization channel sub-carriers are repeated, the common synchronization channel sub-carriers carrying a complex sequence which is different for respective antenna of one base station and being common across multiple base stations, and contents of the dedicated pilot channel sub-carriers being at least locally unique to a particular base station.

In some embodiments, the method further involves for transmitter switching, averaging the C/I or similar value over a time interval for each transmitter thus identified, and at the end of the time interval instigating a transmitter switch to the transmitter with the largest average C/I or similar value if different from a currently selected transmitted.

BRIEF DESCRIPTION OF THE DRAWINGS

Preferred embodiments of the invention will now be described in greater detail with reference to the accompanying diagrams, in which.

DETAILED DESCRIPTION OF THE PREFERRED EMBODIMENTS

Figure 1A:
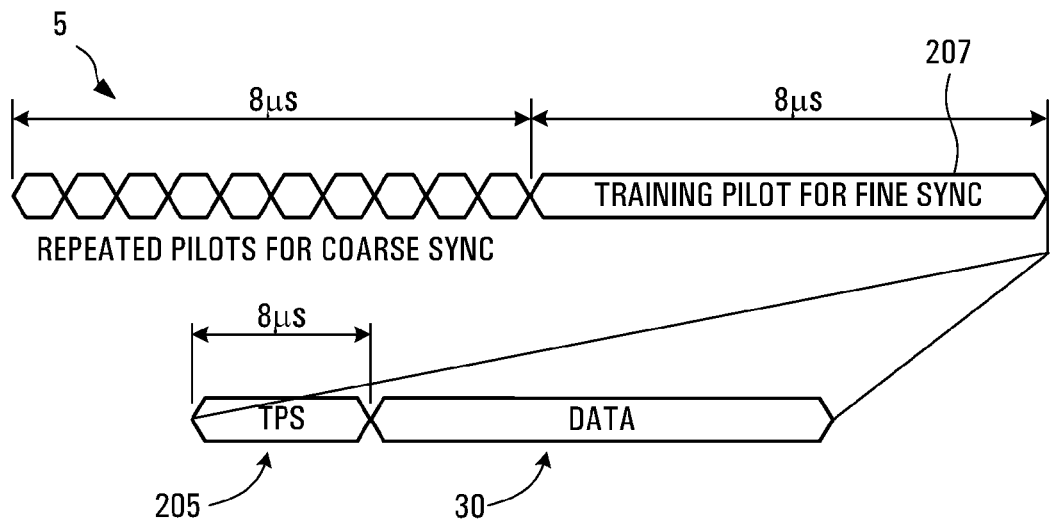
FIG. 1A is the frame structure of IEEE 802.11 standard in the time domain.
Figure 1B:
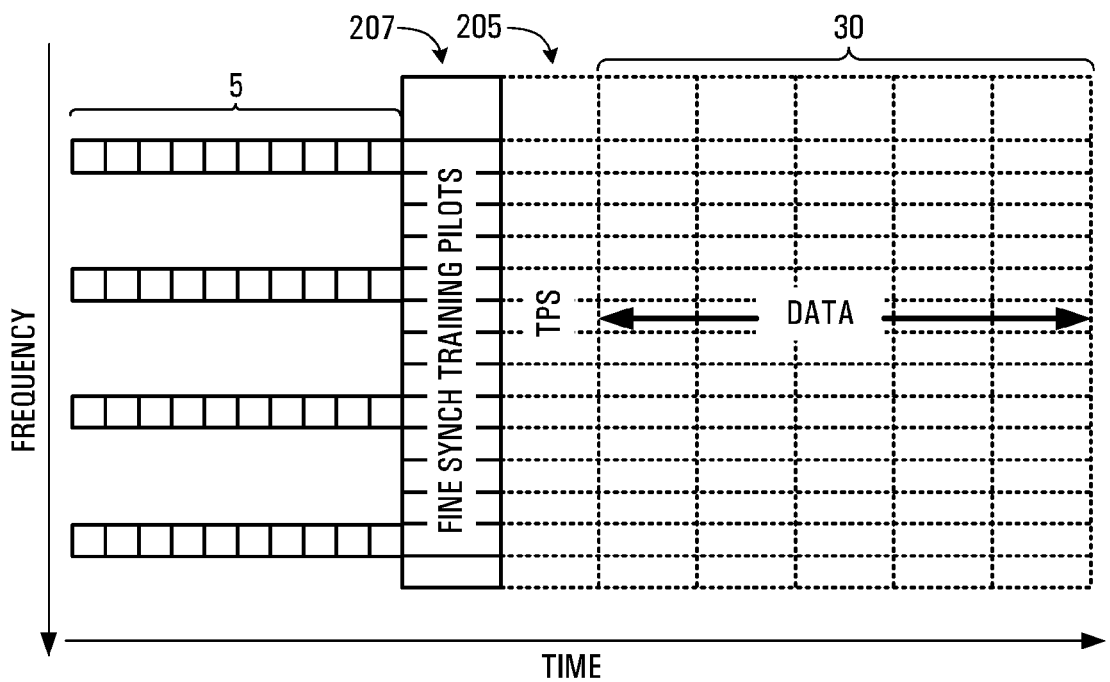
FIG. 1B is the frame structure of FIG. 1A in the frequency domain.
Figure 2A:
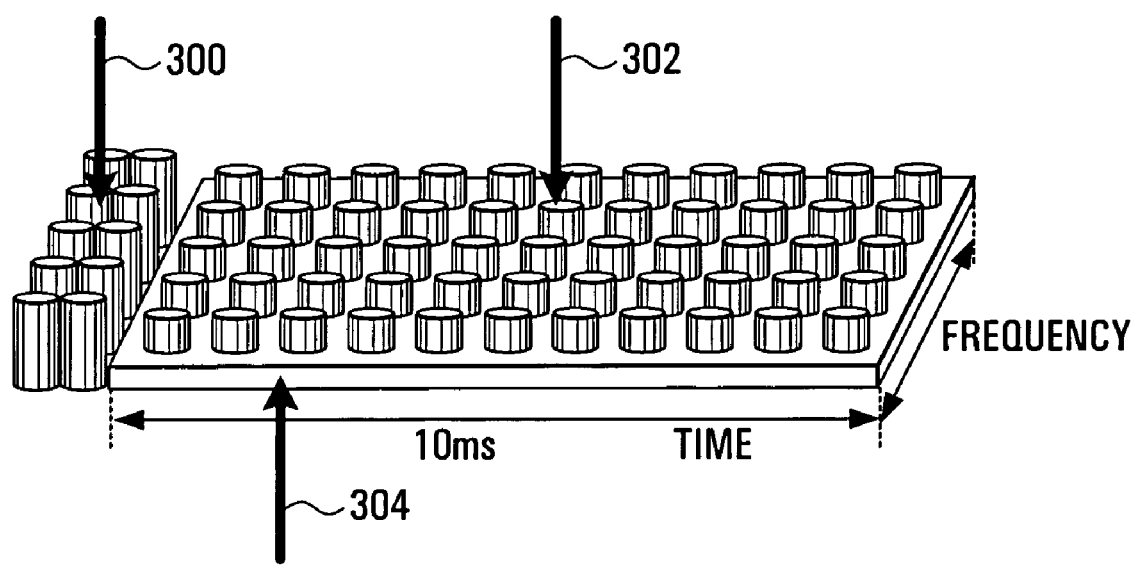
FIG. 2A is a packet data frame structure provided by an embodiment of the invention.

Referring now to FIG. 2A, an OFDM packet frame structure provided by an embodiment of the invention is shown. Transmit OFDM symbol streams are organised into such frames. Each frame consists of three major components: preamble 300, scattered pilots 302, and traffic data symbols 304. The insertion of the preamble allows UE (user equipment) to perform the following fundamental operations: fast BTS (base station) access, BTS identification and C/I ratio measurement, framing and timing synchronization, frequency and sampling clock offset estimation and initial channel estimation. The design of a frame preamble with minimized overhead is critical to maximum spectral efficiency and radio capacity.

Figure 2B:
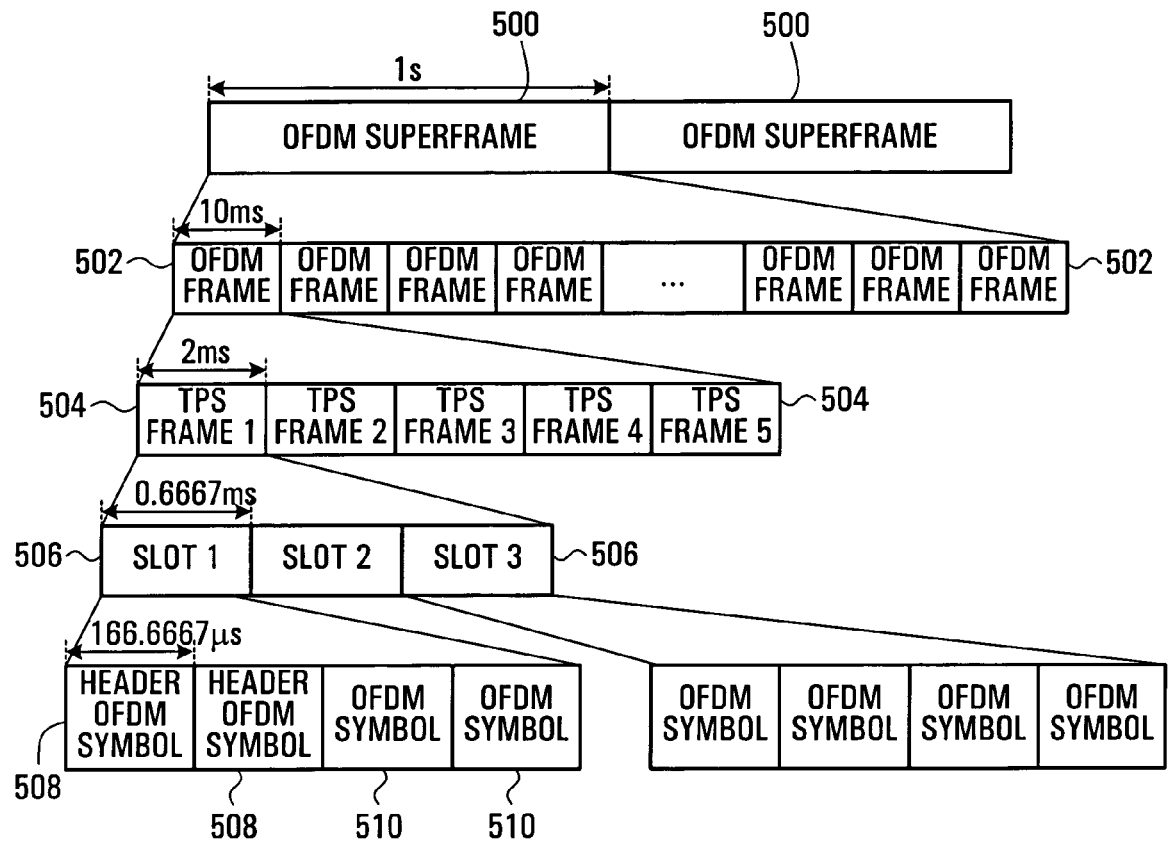
FIG. 2B is a packet frame hierarchy provided by an embodiment of the invention.

Referring now to FIG. 2B, a frame hierarchy for MIMO-OFDM is organized according to an embodiment of the invention as follows: at the highest level are OFDM superframes 500 (two shown). The duration of the superframe is determined by the network synchronization period (for example 1-second). The superframe is composed of several 10 ms radio frames 502 also referred to as OFDM frames. There would be 100 10 ms OFDM frames 502 in a is super-frame 500.

To support adaptive coding modulation (ACM), a fast signalling channel (TPS channel-transmission parameter signalling) is introduced. Each OFDM frame 502 is subdivided into TPS frames 504, in the illustrated example there are five 2 ms TPS frames for each 10 ms radio frame 502. The frame length used for TPS in some embodiments is the same as the duration of the ACM unit. Each TPS frame also contains signalling information which allows each user to determine whether the current TPS frame contains data for them or not. A TPS frame may contain data for multiple users.

The TPS frame 504 can be divided further into several slots 506, each of which consists of several OFDM symbols. In the illustrated example, each TPS frame 504 is subdivided into 3 slots 506. The duration of the slot 506 depends upon the air interface slot size. The smallest transmission unit is one OFDM symbol 508, 510. The duration of one OFDM symbol is determined by the transmission environment characteristics, for example, the maximum channel delay, the system-sampling clock and the maximum Doppler. In the illustrated example, there are four OFDM symbols 508, 510 per slot 506.

To reduce the overhead caused by the insertion of the guard interval between OFDM symbols, different OFDM symbol modes each with a different symbol duration and a different prefix can be designed, for example, 0.5 k mode and 1 k mode. To simplify the system the sampling frequency is kept unchanged when doing the mode switching. These different modes are described in more detail below.

The frame structure of FIG. 2B gives an example of a frame structure hierarchy compatible to the UMTS air-interface. At the OFDM symbol level, there are two different types of OFDM symbols. These include the preamble OFDM symbols 508 and regular data symbols 510.

Figure 4:
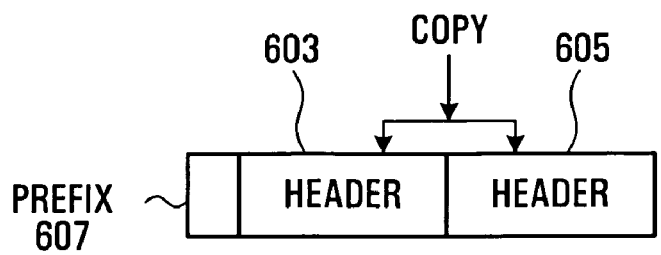
FIG. 4 is a preamble header structure in the time domain provided by an embodiment of the invention.

Referring now to FIG. 4, which is a time domain representation, each OFDM frame starts with a preamble, which consists of several identical header OFDM symbols 603, 605 preceded by a prefix 607 which is a cyclic extension of the header OFDM symbols. A repetition structure is used to assist synchronization. By performing a correlation between adjacent OFDM symbols until two identical symbols are identified, the start of an OFDM frame can be found. By way of example, there may be 1056 samples used per OFDM symbol. For the preamble, during the prefix 607, the last 64 samples of the header OFDM symbols are transmitted. There is no prefix for the second header OFDM symbol. The header is inserted periodically, and for the example of FIG. 2B, this occurs every 10 ms, i.e. at the beginning of every OFDM frame.

Referring again to FIG. 2B, it is noted that for non-header OFDM symbols, i.e. for the regular OFDM symbols 510, every OFDM symbol preferably also has a prefix. In "1K" mode, there are 32 prefix samples, and 1024 actual samples representing the FFT size, for a total of 1056 samples per symbol. In 1/2K mode, there is a 16 sample prefix, and then 512 samples per symbol (representing the FFT size) for a total of 528 samples/symbol. Advantageously, using the frame structure of FIG. 2B these different modes can be supported without changing the sampling frequency. When in 1/2K mode, there are twice as many OFDM symbols 510 per slot 506. The particular mode chosen at a given instant should be such that the prefix size is greater than the maximum channel delay in 1/K mode, more OFDM symbols are sent with fewer sub-carriers. This is more robust to high Doppler, because the symbol duration is shorter. Also, the spacing between the sub-carriers is larger further enhancing tolerance to Doppler.

Thus, there is a unified frame structure which accommodates different FFT sizes, but with the same sampling rate a the receiver. Preferably the same preamble is used even for the different modes.

Figure 3:
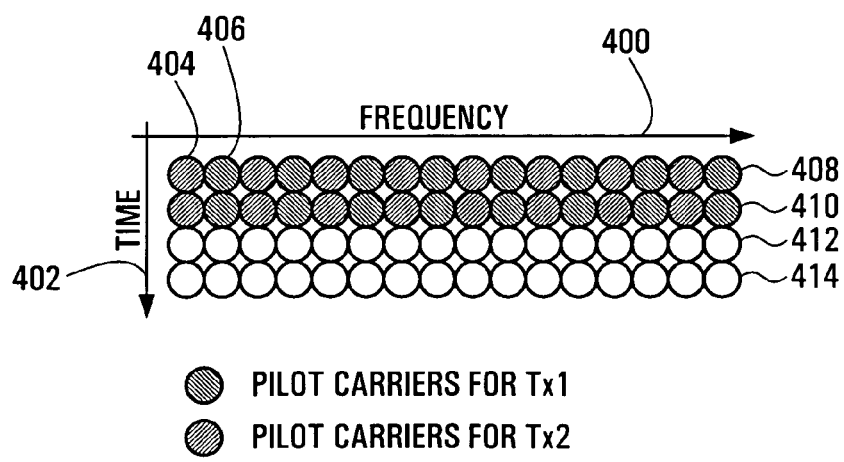
FIG. 3 is a proposed header structure provided by an embodiment of the invention.

OFDM is a parallel transmission technology. The whole useful bandwidth is divided into many sub-carriers, and each sub-carrier is modulated independently. According to an embodiment of the invention, to separate different antenna with multiple antennas transmission, during the header not all sub-carriers are used on all transmit antennas. Rather, the sub-carriers are divided between antennas. An example of this will now be described with reference to FIG. 3. The sub-carrier frequencies contained within an OFDM symbol are each represented by circles. In this example it is assumed that there are two transmitting antennas in the MIMO system. FIG. 3 shows OFDM symbols with the various sub-carriers spaced along the frequency axis 400, and with the contents of all the sub-carriers at a given instant representing one symbol in time, as indicated along the time axis 402. In this case, the first two OFDM symbols 408, 410 are used for dedicated pilot channel information while the remaining symbols (only two shown, 412, 414) are used for regular OFDM symbols. The dedicated pilot channel information transmitted on the first two OFDM symbols 408, 410 alternates by sub-carrier between being transmitted by the first antenna and the second antenna. This is indicated for the first sub-carrier 404 which is transmitting dedicated pilot channel information for the first transmitter and sub-carrier 406 which is transmitting dedicated pilot channel information for the second sub-carrier, and this pattern then repeats for the remainder of the sub-carriers. The other OFDM symbols 412, 414 contain information transmitted by both antennas. It is to be understood that other spacings could alternatively be used. Furthermore, if there are more then two transmit antennas, the pilot channel information would then alternate by sub-carrier in some predetermined pattern between all of the transmit antennas.

In another embodiment, a common synchronization channel, and dedicated pilot channel are frequency multiplexed onto the header symbols. A respective set of non-overlapping sub-carriers are assigned for each antenna to transmit respective dedicated pilot channel and common synchronization channel.

In another embodiment a common synchronization channel, dedicated pilot channel and a broadcasting channel are frequency multiplexed onto the header symbols. Under this arrangement, the total useful sub-carriers of the header symbols are separated into three groups. These three groups are mapped onto the common synchronization channel, dedicated pilot channel and the broadcasting channel respectively.

Figure 5:
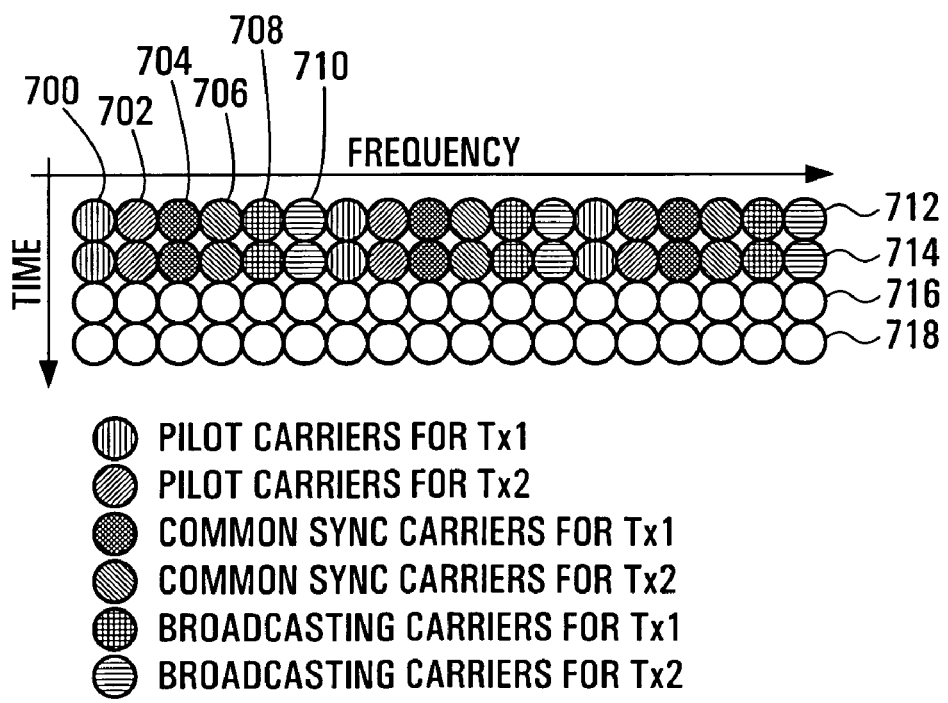
FIG. 5 is a preamble header structure in the frequency domain provided by an embodiment of the invention.

An example of the mapping of the different channels in the MIMO-OFDM system with two-transmitter diversity is shown in FIG. 5. In this example, there are shown four OFDM symbols 712, 714, 716, 718 two of which 712, 714 are header symbols. During the header symbols 712, 714 every second sub-carrier is used for the first antenna with the remaining sub-carriers used for the second antenna. This is easily generalized to higher numbers of antennas. For this example, it is assumed that there are two transmit antennas in the MIMO system. Every sixth sub-carrier starting at the first sub-carrier 700 is for the first transmitter dedicated pilot channel sub-carriers. Every sixth sub-carrier starting at the second sub-carrier 702 is for the second transmitter dedicated pilot channel sub-carrier. Every sixth sub-carrier starting at the third sub-carrier 704 is for the first transmitter common synchronization channel sub-carrier. Every sixth sub-carrier starting at the fourth sub-carrier 706 is for the second transmitter common synchronization channel sub-carrier. Every sixth sub-carrier starting at the fifth sub-carrier is for broadcasting channel sub-carriers for the first antenna, and every sixth sub-carrier starting at the sixth sub-carrier 710 is for broadcasting channel sub-carriers for the second antenna.

The common synchronization channel is a universal channel for initial access. It can also be used for synchronization and preliminary channel estimation. The different transmitters share the common synchronization sub-carriers when transmitter diversity is applied. In which case as indicated above the common synchronization channel is divided between different transmitters. A common complex sequence known by all the terminals is used to modulate the sub-carriers reserved for the common synchronization channel. The same common synchronization sequence is transmitted by all base stations within a system. There may be one or more such synchronization sequences in the event that there are multiple transmit antennas such that each transmit antenna can transmit a unique synchronization sequence. Using the synchronization sequence, mobile stations are able to find initial synchronization positions for further BTS identification by looking for a correlation peak between received synchronization sequence and the known transmitted synchronization sequence.

The dedicated pilot channel is used for BTS/cell identification, and supports C/I measurement for the cell selection, cell switching and handoff. A unique complex sequence, for example a PN code, is assigned to each BTS and used to modulate the dedicated pilot sub-carriers. A different unique sequence is transmitted by each antenna in the multiple transmit antenna case. Unlike the case for the common synchronization channel, different base stations transmit using different pilot sequences. The quasi-orthogonality of the PN codes assigned to different BTSs makes it possible to do access point identification and initial interference measurement. The dedicated pilot channel can also be used to assist the synchronization processing.

To fully utilize the sub-carriers in the header OFDM symbols, as indicated above, some sub-carriers are preferably used as a broadcasting channel. In the example of FIG. 5, two of every six sub-carriers are used for this purpose. The broadcasting channel can carry important system information. STTD (space time transmit diversity) schemes cannot be used for the broadcasting channel (or any of the sub-carriers in the header OFDM symbols) because of it will destroy the repetition structure of the header OFDM symbols which is required by synchronization algorithms. However transmitting the broadcasting information by all transmitters on the same sub-carrier may cause destructive interference between transmitters. To solve that problem the broadcasting channel is partitioned between different transmitters, so in the two transmit antenna case, the sub-carriers (mapped for the broadcasting channel) can be assigned alternatively for the transmit antenna to provide diversity. Power boosting may be applied to further enhance the broadcasting channel.

The broadcasting information from different BTS's can be different. In some embodiments broadcasting information is protected so those users close to the cell boundaries can receive it correctly in the presence of strong interference. A short PN code could be used to spread the broadcasting information. The neighbouring BTS is assigned to use different code. The insertion of the broadcasting channel reduces the preamble overhead and increases the spectrum efficiency.

The broadcast channel is used to transmit information unique to the particular base station. A single broadcast message may be sent on the combined broadcast channel carriers for the two antennas. By designing the preamble header symbol to consist of pilot channel, synchronization channel and the broadcasting channel, the preamble header overhead is reduced. The common synchronization channel is designed for fast and accurate initial acquisition. The dedicated pilot channel with a BTS specific mapped signature allows an efficient BTS identification. The combined common synchronization channel and the pilot channel are used together for MIMO channel estimation. The use of the combined common synchronization channel and the dedicated pilot channel also allows for high accuracy synchronization. Frequency domain training symbols are robust to timing error and multipath environments. The preamble design allows the flexibility of the user equipment to implement more efficient algorithms.

It is noted that the specific breakdown of sub-carriers between the dedicated pilot channel in one embodiment, between the dedicated pilot channel and common synchronization channel in another embodiment, and between the dedicated pilot channel, common synchronization channel and broadcast channels in another embodiment, are only specific examples. These can be allocated in any suitable manner.

Figure 6:
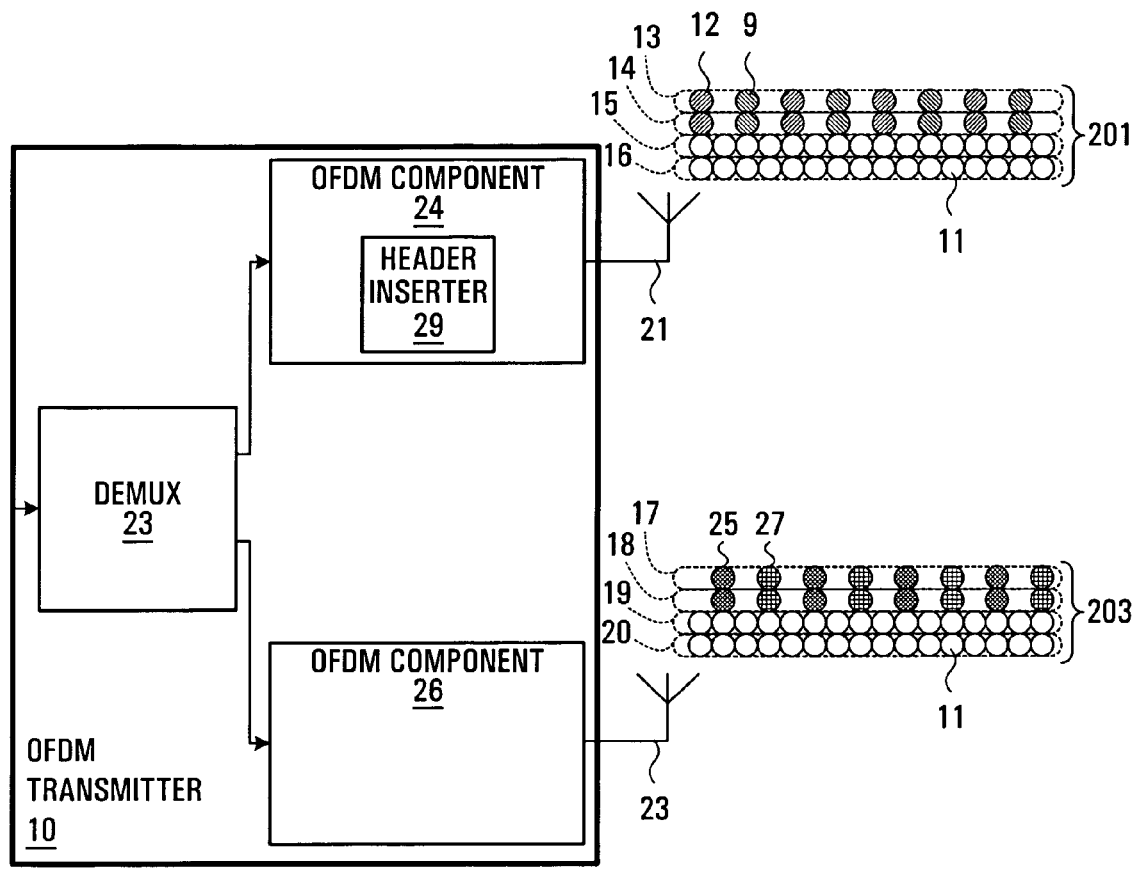
FIG. 6 is a conceptual schematic view of a MIMO-OFDM transmitter provided by an embodiment of the invention.

Referring now to FIG. 6, shown is a conceptual schematic of a MIMO-OFDM transmitter 10. A first sample set of four OFDM symbols 201 is shown transmitted from a first transmit antenna 21 and a second sample set of four OFDM symbols 203 is shown transmitted from a second transmit antenna 23. In general an OFDM transmitter will have $N_{ant}$ transmit antennae, where $N_{ant}$ is a design parameter. Within the MIMO-OFDM transmitter 10, data originating from a demultiplexer 23 are sent to one of either a first OFDM component 24 connected to transmit antenna 21 or a second OFDM component 26 connected to transmit antenna 23. The components organize the data onto sub-carriers of OFDM symbols and OFDM frames, each sub-carrier being at a different orthogonal frequency. Each OFDM component 24,26 has a respective header inserter 29 which inserts header OFDM symbols. The sample sets of OFDM symbols 201 and 203 represent the first four OFDM symbols of the transmitted OFDM frame from transmit antennae 21 and 23, respectively, where each row of data symbols or pilot symbols is an OFDM symbol. A first OFDM symbol 13 and a second (identical to the first) OFDM symbol 14 represent the two header OFDM symbols unique to the OFDM frame transmitted by first transmit antenna 21. Similarly, a third OFDM symbol 17 and a fourth (identical to the third) OFDM symbol represent the two header OFDM symbols unique to the OFDM frame transmitted by the second transmit antenna 23. Four OFDM symbols 15, 16, 19, 20 are typically non-identical OFDM symbols made up of a plurality of data symbols, with at least one data symbol indicated generally at 11 on each OFDM sub-carrier. An entire OFDM frame would typically have many more data symbols. Also, the OFDM symbols 201 are transmitted concurrently, and with the same timing, as OFDM symbols 203.

In this example, the two identical header OFDM symbols consist of dedicated pilot channel sub-carriers 12 and common synchronization channel sub-carriers 9. There may also be broadcast channel sub-carriers, not shown. The dedicated pilot channel sub-carriers are used for C/I ratio measurement and BTS identification and fine synchronization as detailed below; they can also be used for initial channel estimation. The common synchronization channel sub-carriers 9 are used for coarse synchronization and fine synchronization, initial access, and initial channel estimation.

In the illustrated example, during the two header OFDM symbols, the first of every four consecutive sub-carriers is used to carry dedicated pilot channel symbols transmitted by transmitting antenna 21. Similarly, the second of every four consecutive sub-carriers is used to carry dedicated pilot channel symbols transmitted by transmitting antenna 23.

The dedicated pilot channel symbols transmitted on the pilot channel sub-carriers 12, 25 are defined by base station/sector specific PN sequence. A set of symbols from a complex pseudo-random PN sequence unique to the base station is mapped onto the dedicated pilot channel sub-carrier locations in the header OFDM symbols.

The third of every four consecutive sub-carriers in the two header symbols is used to carry common synchronization channel symbols transmitted by transmitting antenna 21. Similarly the fourth of every four consecutive sub-carriers is used to common synchronization channel symbols transmitted by transmitting antenna 23.

The common synchronization channel symbols transmitted on the common synchronization sub-carriers 9, 27 are defined by unique complex pseudo-random PN sequence for each transmit antenna 21 and 23. A set of symbols from this complex pseudo-random PN sequence is mapped onto the common synchronization channel sub-carriers in the header OFDM symbols. That is, the common synchronization channel symbols of each frame transmitted through each transmitting antenna use a PN code unique to that transmitting antenna but which is the same for corresponding transmitting antennas of other base stations. In the present example $PN_{SYNC}^{(1)}$ is associated with transmit antenna 21 and $PN_{SYNC}^{(2)}$ is associated with transmit antenna 23. However, similar antennae in different transmitters throughout the communication network will use the same PN code. For example, the common synchronization channel symbols for a first transmit antenna 21 on all transmitters within the network will use one PN code ($PN_{SYNC}^{(1)}$), and the common synchronization channel symbols for a second transmit antenna 22 on all transmitters within the network will use a different PN code ($PN_{SYNC}^{(2)}$).

Figure 7A:
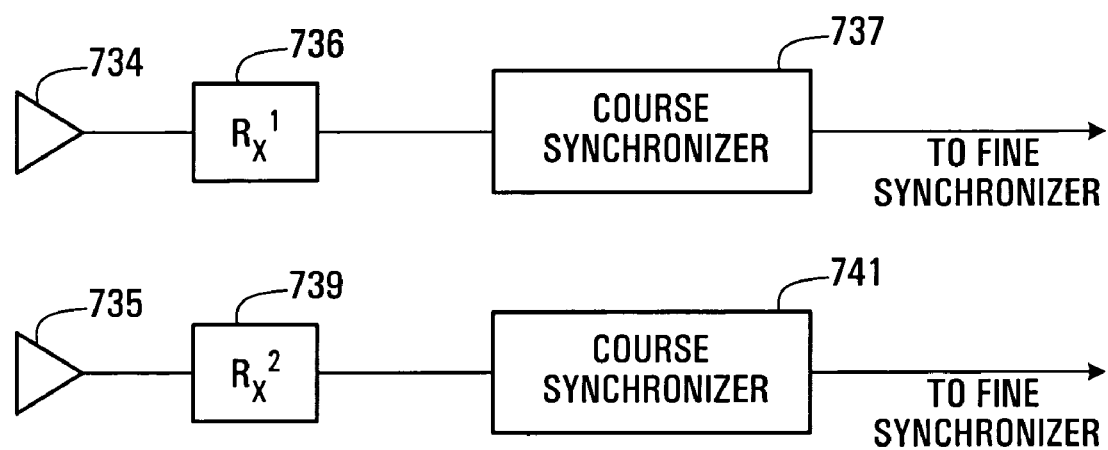
FIG. 7A is a block diagram of a MIMO-OFDM coarse synchronization functionality.

Referring to FIG. 7A, a block diagram of MIMO-OFDM receiver functionality is shown which is adapted to perform coarse synchronization based on the two repeated OFDM header symbols transmitted by each transmit antenna as detailed above. The OFDM receiver includes a first receiving antenna 734 and a second receiving antenna 735 (although more generally there will be a plurality of N receiving antennae). The first receiving antenna 734 receives a first received signal at RF receiver 736. The first received signal is a combination of the two signals transmitted by the two transmitting antennae 21 and 23 of FIG. 6, although each of the two signals will have been altered by a respective channel between the respective transmitting antenna and the first receiving antenna 734. The second receiving antenna 735 receives a second received signal at RF receiver 739. The second received signal is a combination of the two signals transmitted by the two transmitting antennae 21 and 23, although each of the two signals will have been altered by a respective channel between the respective transmitting antenna and the second receiving antenna 735. The four channels (between each of the two transmitting antennae and each of the two receiving antennae) may vary with time and with frequency, and will in general be different from each other.

Coarse synchronization is performed for the first receive antenna 734 by a coarse synchronizer 737 on discrete time samples of a received signal to determine an approximate range of a location of the starting position of the first header symbol. A similar process is performed by coarse synchronizer 741 for the second antenna 735. Coarse synchronization is facilitated by the use of repeated header symbols at the OFDM transmitter. The coarse synchronizer 737 performs correlation measurements on time domain signal samples in successive OFDM symbols. The time domain signal sample yielding the highest correlation measurement is the coarse synchronization position $n_{coarse}$. The coarse synchronization position $n_{coarse}$ is then used as the position on which to locate an FFT window within the FFT functions used in fine synchronization.

Initially, the coarse synchronizer 737 starts the time domain coarse synchronization processing. A running buffer (not shown) is used to buffer discrete time samples of the received signal over three successive OFDM symbol period, and then calculates the auto-correlation $\gamma_t(n)$ between samples collected during two successive OFDM symbol durations as follows:

$$\gamma_t(n) = \sum_{i=0}^{N_{header}-1} x(n+i) \cdot x*(n+i+N_{header})$$

where x(n) is the time domain samples of the received signal, $N_{header}$ is the number of samples taken over one OFDM symbol duration.

In some embodiments, a moving correlator is applied in the real time implementation to save calculation power.

In one embodiment, the values of $\gamma_t(n)$ are calculated in sequence, for n=1 (until n=$N_{header}$), until a correlation value is above a threshold, after which a maximum search is enabled. The computation of the correlation values continues and the maximum search process will continue until the correlation result is below the threshold again. The sample position corresponding to the maximum correlation value is the coarse synchronization position:

$$n_{coarse} = arg\ max(|\gamma_t(n)|) n \in \{\gamma_t(n) > \gamma_{threshold}\}$$

The threshold is typically calculated from the average auto-correlation values within one frame. Alternatively, another way of finding the maximum is to determine a local maximum for each OFDM symbol over an OFDM frame which might be 60 symbols in length for example. Then, the overall maximum is taken to be the maximum of the local maxima. This process is conducted both coarse synchronizers. In the event fine synchronization is to proceed jointly, the overall coarse synchronization position may be taken as some combination of the two synchronization values, and is preferably taken to be the earlier of two coarse synchronization positions thus determined. Alternatively, each fine synchronizer (detailed below) can work from a respective coarse synchronization position.

Figure 7B:
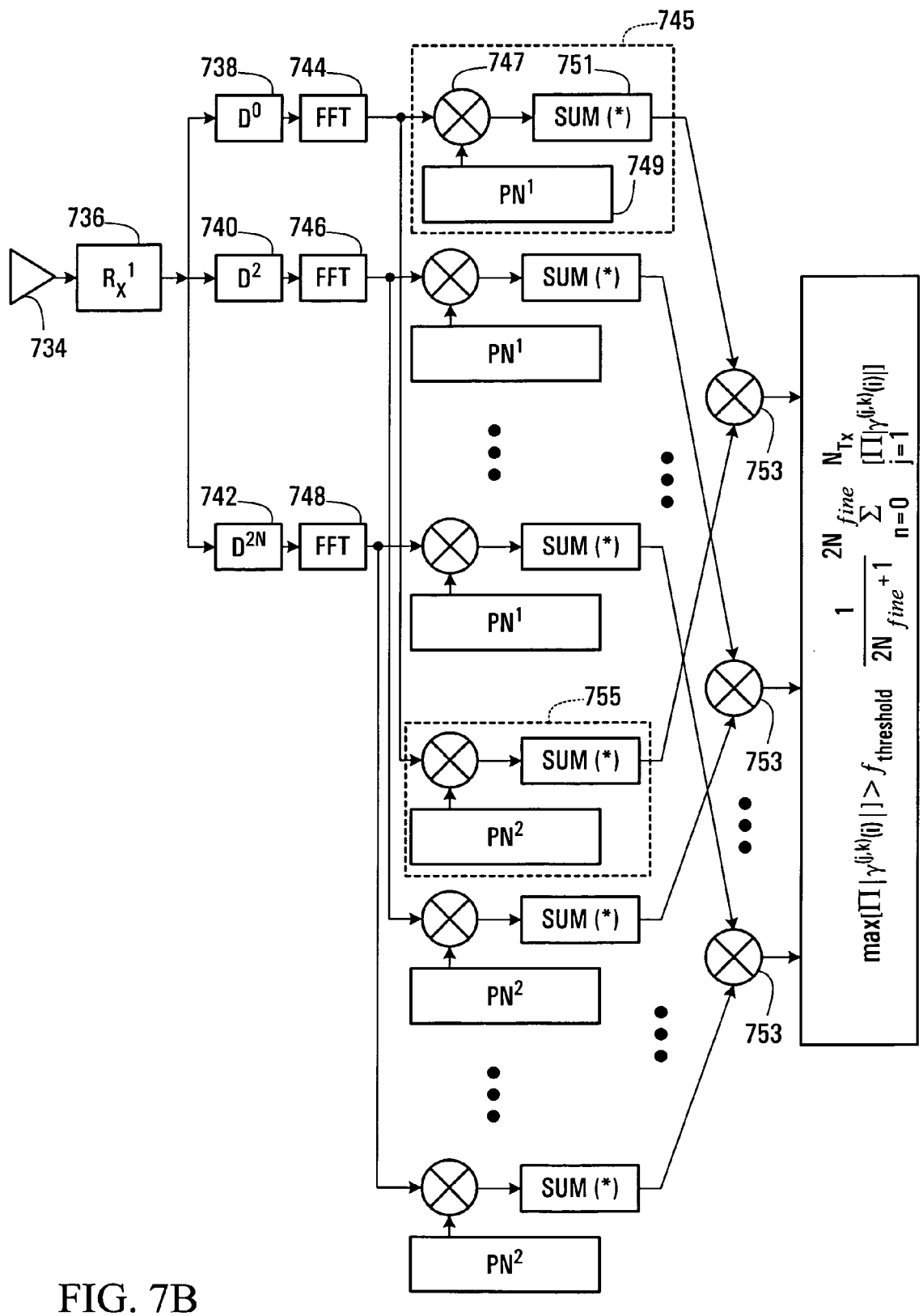
FIG. 7B is a block diagram of a MIMO-OFDM fine synchronization functionality.

Referring to FIG. 7B, a block diagram is shown of an MIMO-OFDM fine synchronization functionality is shown. In one embodiment, the fine synchronization functionality is adapted to perform fine synchronization based on the two-repeated OFDM header symbols transmitted by each transmit antenna as detailed above using the common synchronization channel and/or the dedicated pilot channel. More generally, the fine synchronization functionality can perform fine synchronization for OFDM frames within which some known training sequence has been embedded. Also, an input to the fine synchronization process is a coarse synchronization position. This coarse synchronization position may be determined using the above discussed method, or using any other suitable method. The components which are identical to those of FIG. 7A are similarly numbered and in an actual implementation would be shared if the common synchronizers of FIG. 7A are to be used. The functionality of FIG. 7B is replicated for each of the one or more receive antenna.

A fine synchronization process is performed for each of one or more receive antennae, and then an overall synchronization position is taken based on a combination of the fine synchronization positions. By way of overview, once the coarse synchronizers have determined the coarse synchronization position(s) $n_{coarse}$, each fine synchronizer performs an FFT on the signal samples on either side of the coarse synchronization position, to generate frequency domain components over the frequency band of OFDM sub-carriers. Each fine synchronizer searches the frequency domain components in order to locate the precise location of the FFT window. The precise location of the FFT window is required in order to perform OFDM demodulation in the frequency domain. The fine synchronizer locates the precise location of the FFT window by performing correlation measurements between the known PN codes ($PN_{SYNC}^{(1)}$ & $PN_{SYNC}^{(2)}$) and the frequency components within a searching window defined with respect to the coarse synchronization position $n_{coarse}$. The correlation measurements performed by each fine synchronizer are performed in the frequency domain, and one set of correlation measurements is performed for each known PN code ($PN_{SYNC}^{(1)}$ & $PN_{SYNC}^{(2)}$) that is, for each transmitting antenna 21 and 23 (or for how many of the one or more transmit antenna there are).

Each fine synchronizer selects $N_{symbol}$ signal samples starting at an initial signal sample within the searching window, where $N_{symbol}$ is the number of signal samples in an OFDM symbol. For each transmitting antenna, each fine synchronizer determines a correlation measurement between the frequency domain signal samples and the PN code corresponding to the transmitting antenna.

More specifically, fine synchronization searching is performed near $n_{coarse}$. Supposing that the searching window is 2N+1, the searching range is from ($n_{coarse}$−N) to ($n_{coarse}$+N). Let $n_{start}(i)=n_{coarse}+N-i$ represent the sample index within the fine searching window, where i=0, . . . , 2N. The fine synchronization starts from i=0. Then $N_{symbol}$ samples are taken starting from $n_{start}(0)$, the prefix is removed and FFT is performed. The received OFDM symbol in frequency domain can be written as:

$$R(l,i)=FFT(x(n(i),l)), n(i)=[n_{start}(i)+N_{prefix}, n_{start}(i)+N_{symbol}-1]; l=1,\ldots, N_{FFT};$$

where $N_{prefix}$ is the number of prefix samples and $N_{FFT}$ is the FFT size.

From R, the complex data $R^{(j,k)}$ SYNC carried by the common synchronization channel of different transmitters is extracted, since common synchronization channels are divided between different transmitters in MIMO OFDM system. More generally, the complex the data corresponding to a transmitted training sequence is extracted. The correlation between $R^{(j,k)}_{SYNC}$ and $PN^{*(j)}_{SYNC}$ is:

$$\gamma_f^{(j,k)}(i) = \sum_{m=0}^{N_{SYNC}-1} R^{(j,k)}_{SYNC}(m, i) \cdot PN^{*(j)}_{SYNC}(m), \quad i = 0, \ldots, 2N$$

where j=1, 2, . . . , $N_{Tx}$ indicates transmitter, k=1, 2, . . . , $N_{Rx}$ indicates receiver, $PN^{(j)}_{SYNC}$ is the common SYNC PN code for $j^{th}$ transmitter and $N_{SYNC}$ is the size of common PN code.

Then the starting point index $n_{start}$ is shifted by one ($n_{start}(1)=n_{start}(0)-1$), and another $N_{symbol}$ samples are processed as described above. In order to get the new frequency domain data $R^{(j,k)}_{SYNC}(m,i)$, we need to perform FFT again. An iterative method can be used for this purpose to reduce the computational complexity:

$$R(l,i)=R(l,i-1)\cdot e^{i2\pi(k-1)/NFFT}+x(n_{start}(i)+N_{prefix})-x(n_{start}(i-1)+N_{symbol}-1)$$

where NFFT is the FFT size. Extracting $R^{(j,k)}_{SYNC}(m,i)$, the new correlation is calculated. The above procedure is continued until $n_{start}$ moves out of the fine searching window.

$$n_{fine} = \arg\max\left(\prod_{j=1}^{N_{Tx}} \prod_{l=1}^{N_{Rx}} |\gamma_f^{(j,k)}(i)|\right)$$

For each receive antenna, a respective fine synchronization position can be found by finding $n_{start}(i)$ corresponding to the maximum of the products of the correlation results from different antennas over i=0, . . . , 2N. In mathematical terms, for the kth receive antenna, a respective fine synchronization position can be selected according to:

$$n_{fine}(k) = \arg\max\left(\prod_{j=1}^{N_{Tx}} |\gamma^{(j,k)}(i)|\right)$$

To reduce the possibility of false alarm, a criterion may be set. For example, the fine synchronization may be considered to be achieved if the following condition is satisfied, $$\max\left(\prod_{j=1}^{N_{Tx}} |\gamma^{(j,j)}(i)|\right) > N_{threshold} \cdot \frac{1}{2N+1} \cdot \sum_{i=0}^{2N} \prod_{j=1}^{N_{Tx}} |\gamma^{(j,j)}(i)|$$

where $N_{threshold}$ is a factor determined by the pre-set fine searching window size. Preferably, an overall fine synchronization position is then taken to be the earliest of the fine synchronization positions determined for the different receive antennas.

The fine synchronization process for one receive antenna is illustrated diagrammatically in FIG. 7B. At the output of the first receiver 736, blocks D0 738 through D2N 742 represent alignment of the FFT blocks 744, . . . , 748 for the various candidate fine synchronization positions (2N+1 in all). The FFT blocks 744, . . . , 748 compute an FFT on each respective set of samples. Each FFT output is fed to a correlator block for each transmit antenna. If there are two transmit antennae, then there would be two such correlator blocks per FFT output. For example FFT 744 has an output fed to a first correlator block 745 for the first transmit antenna, and fed to a second correlator block 755 for a second transmit antenna. It is noted that if the spacing of the sub-carriers used to transmit the training sequence (the common synchronization sequence or pilot channel sequence in the above examples), a full FFT does not need to be completed in order to recover the training sequence components. The correlator block 745 for the first antenna multiplies with multiplier 747 the recovered training sequence symbol locations of the FFT output by the known training sequence for the first transmit antenna and these multiplications are added in summer 751. This same computation done in correlator 755 for the known training sequence of the second transmit antenna and the training sequence locations for the second transmit antenna. This is done at the first receiver for all of the different possible shifts for each transmit antenna. The correlation results across different transmit antennas for each possible shift are multiplied together in multipliers 753. The shift which results in the maximum of these multiplications is selected to be the fine synchronization position for the particular receiver. The same process is followed for any other receive antennas, and the overall fine synchronization position is preferably taken as the earliest of the fine synchronization positions thus computed.

The timing synchronization can be tracked every frame in case that the synchronization position drifts or losses. For example, in systems employing the previously described preamble, each time a preamble arrives at the receiver the 2-step process of synchronization is repeated, using the same method for coarse synchronization and fine synchronization. In this case, a smaller searching window N may be used based on the assumption that the drift of the synchronization position should be around the vicinity of the current location. After acquisition, the dedicated pilot channel code assigned to modulate dedicated pilot channels for different BTS can be used in the correlator, or the common synchronization sequence can be used, or some other training sequence.

An embodiment of the invention has been described with respect to an MIMO-OFDM transmitter having more than one transmitting antenna. The method of performing synchronization at the OFDM receiver may also be applied to a signal received from an OFDM transmitter having only one transmitting antenna, as long as a known training sequence is inserted in the frame by the OFDM transmitter.

Lastly, in the embodiment of the invention described thus far there has only been one transmitter having multiple antennae and one receiver having multiple antennae. In what follows, the concepts of the invention will be broadened to encompass the multi-cellular environment having many MIMO-OFDM transmitters and many MIMO-OFDM receivers.

Access in a Multi-Cellular Environment

System access in a multi-cellular environment introduces the new problem of cell selection, as there will be many transmitters transmitting the same common pilot symbols. In another embodiment of the invention, the previously introduced transmit header is used by receivers to perform systems access and cell selection.

Figure 8:
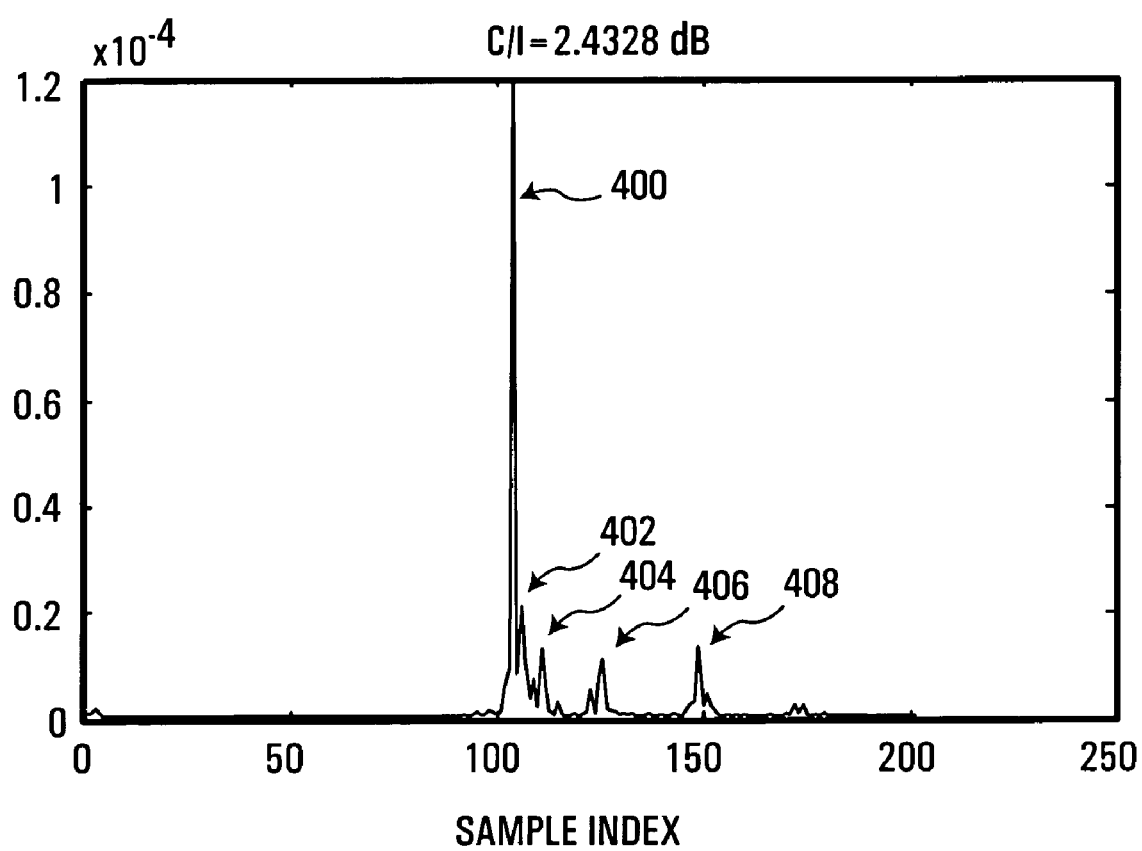
FIG. 8 is a plot of a signature sequence correlation output for pilot channel showing several candidate synchronization position.

During initial acquisition, the UE starts by performing coarse synchronization. This may be done using the previously described methods, or some other method. After one frame duration, the coarse synchronization position is determined. Fine synchronization search algorithm is performed afterwards based on the common synchronization channel. Because the data carried by the common synchronization channel are the same for all BTS, several fingers (peaks) can be observed in a multi-cell environment and multi-path fading propagation channels. These fingers usually correspond to different BTS and/or different paths. Referring to FIG. 8, shown is an example of fine synchronization (to the common synchronization channel) raw output computed in a multi-cellular environment as a function of sample index. In the present example there are five significant fingers 400, 402, 404, 406, and 408. The M strongest fingers are chosen and the corresponding positions are located, where M is a system design parameter. These positions are used as candidates for final synchronization and also as the positions upon which BTS identifications are made.

Figure 9:
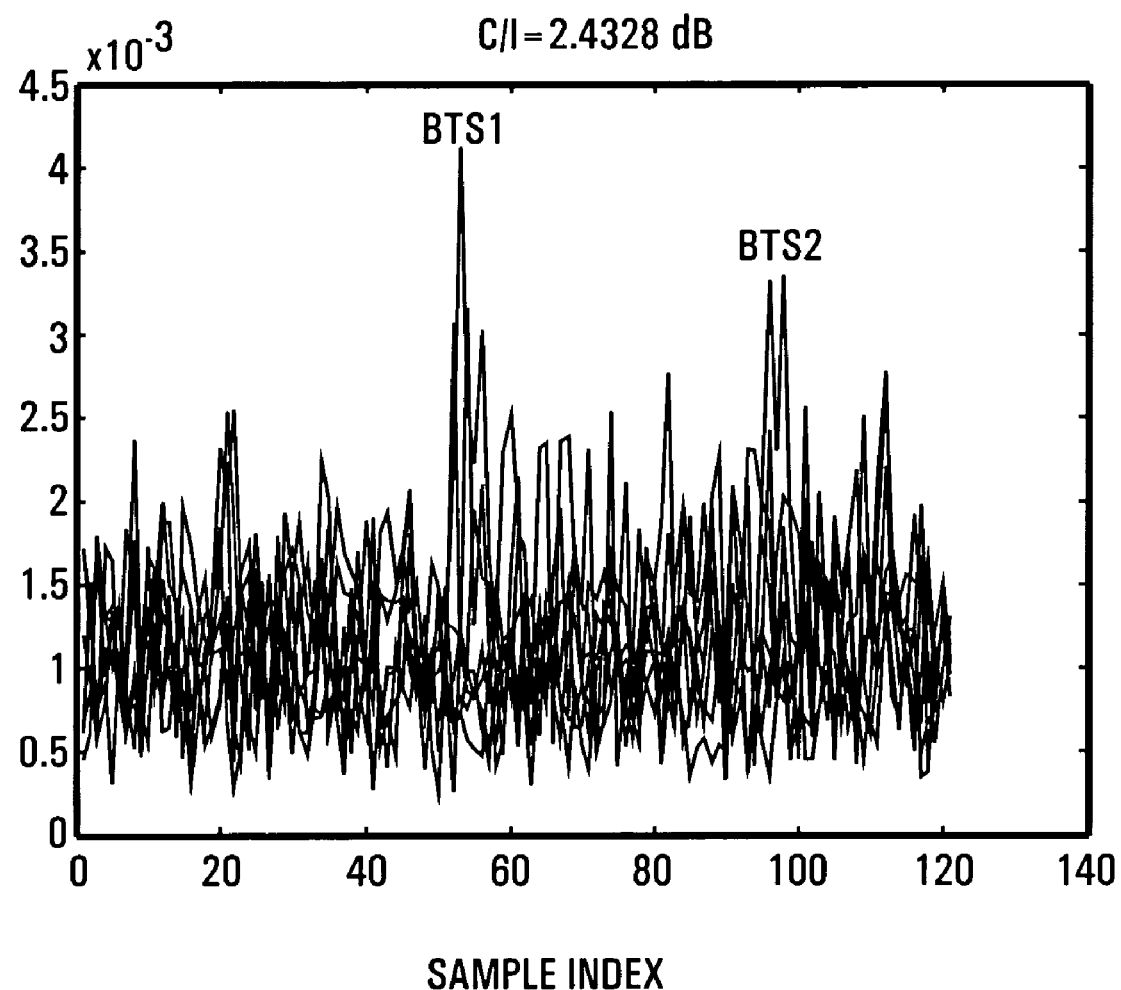
FIG. 9 is a plot of a BTS identification simulation.

The results of FIG. 8 do not allow BTS identification because BTS transmit the same common synchronization sequences. At each candidate synchronization position, the correlations of the received dedicated pilot channel sub-carriers and all possible complex sequences (dedicated pilot PN sequences) assigned to different BTS are calculated to scan for the presence of all the possible adjacent BTSs. In the multiple transmit antenna case, preferably this correlation is done on the basis of the combined dedicated pilot PN sequences of the multiple antennas over all of the dedicated pilot sub-carriers to generate a single correlation result for each index. FIG. 9 shows an example of the relation between the BTS scanning results and the checking points (candidate synchronization positions). The BTS identification is realized by detecting the PN code corresponding to the maximum correlation value at each candidate synchronization position. C/I can be computed based on all correlation results at each checking position. At the initial acquisition stage, the cell selection is determined by selecting the BTS with the largest C/I ratio. In the present example two BTS are identified, a first BTS BTS1 and a second BTS BTS2. With multiple-antenna receiver diversity, the final decision of the cell selection should be based on the comparison of the highest C/I obtained by different receiver antennae at a receiver.

To obtain the final synchronization position, fine synchronization is performed again, but by using the dedicated pilot channel and the dedicated complex sequence found through the BTS identification. A smaller searching window around the fine synchronization position is used. The final synchronization results from different receivers are compared. The position corresponding to the earliest sample in time is used as the final synchronization position. This step is to reduce the possibility that a weak path (multi-path) is selected because of the short-term fading. To reduce the false alarm probability, a threshold is set. This threshold can be the ratio of the finger strength with respect to the final synchronization position and the average of the correlation within the search window.

Figure 10:
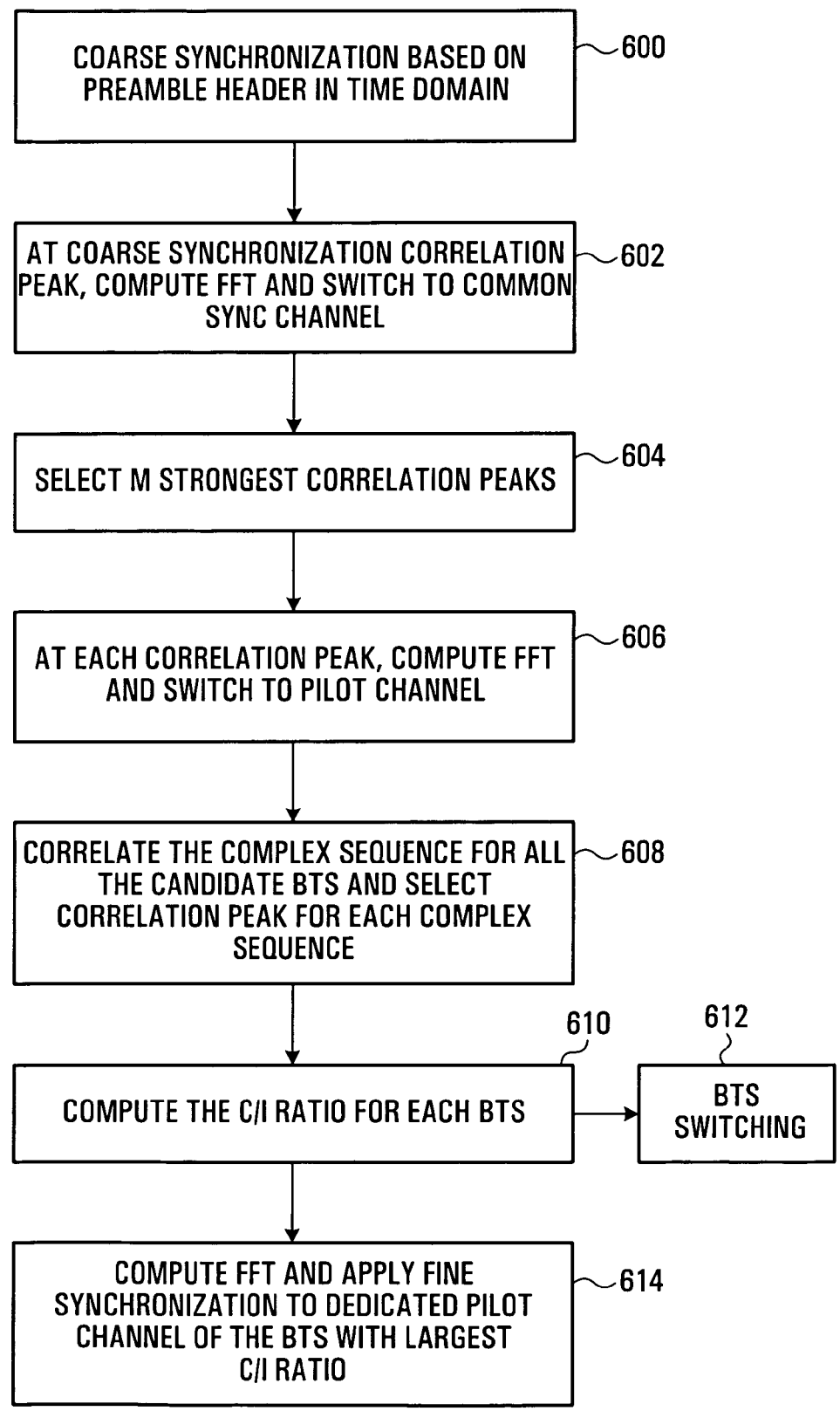
FIG. 10 is a flowchart of a method for cell selection and re-selection for MIMO-OFDM provided by an embodiment of the invention.

In the normal data processing stage, the fine synchronization and the BTS identification steps are repeated every frame when a new preamble is received, but a small set of the candidate PN codes is applied in the BTS scan. After BTS identification, a BTS candidates list can be generated through searching strong interferences. This list is updated periodically, for example every 10 ms, and provides information for BTS switch and even soft handoff. Certain criteria can be set in order to trigger the BTS switch and soft handoff. To average the impact from the fading, the decision for BTS switching and the soft handoff may be based on observation during a certain period. The criteria can be the comparison of the maximum correlation values representing C and the strongest I. It should be noted that after the cell switch and the soft handoff, the synchronization may also be adjusted by the final step in the initial access. The overall cell selection and re-selection method is shown in FIG. 10.

In the first step 600, coarse synchronization is performed for example based on the preamble header in the time domain. This involves finding a coarse boundary between each frame by looking for two identical symbols. Correlating samples over adjacent symbol durations until a peak is found does this. Step 600 relies on a preamble to a frame beginning with two adjacent identical symbols.

Next during step 602, at the coarse synchronization peaks, an FFT is computed, and a switch to the processing of the common synchronization channel in the frequency domain is made. A search window is centered on sync position +/− a certain number of samples. The M strongest correlation peaks are selected, as per 604. At this time, it is not known which BTS each peak is associated with. BTS identification has not yet been determined.

Then at step 606, for each correlation peak, the FFT is again computed and the correlations associated with the fine synchronization procedure are computed using the dedicated pilot channels—these containing a base station specific complex sequences. This is immediately followed by step 608 where the correlation with the BTS identification complex sequences is made in order to allow an identification of the associated base stations. At step 610, a C/I ratio is computed for each BTS thus identified. BTS selection and BTS switching is performed on the basis of these C/I ratios in step 612. AS indicated above, BTS switching is performed on the basis of these C/I ratios averaged over some time interval.

Finally, for access, the FFT is computed and fine synchronization is applied to the dedicated pilot channel of the BTS with the largest C/I ratio as per step 614.

BTS initial synchronization performed on the common synchronization channel. A BTS specific sequence is embedded in the frequency domain and BTS identification processing is performed in the frequency domain allowing the elimination of MIMO-OFDM inter-channel interference. BTS power estimation is performed based on the pilot channel for each MIMO-OFDM BTS. BTS selection is performed based on C/I ratio measurements.

The result is improvement of the synchronization and identification of the serving BTS in a severe multi-path channel and high interference environment by joint BTS synchronization and cell selection. Channel estimation may be performed on a combined common synchronization channel and dedicated pilot channel. Criteria are provided for cell switching and soft handoff by C/I estimation.

In the above example, the access has been performed based on the synchronization channel and pilot channel embedded in the previously discussed preamble. More generally, the access can be performed with such channels embedded in any suitable manner within an OFDM symbol stream.

What has been described is merely illustrative of the application of the principles of the invention. Other arrangements and methods can be implemented by those skilled in the art without departing from the spirit and scope of the present invention.

We claim:

1. A method in an orthogonal frequency division multiplexing (OFDM) receiver, comprising at least one receive antenna, to perform synchronization, the OFDM receiver configured to communicate with a transmitter comprising at least one transmit antenna, the method comprising:
   at each of the at least one receive antenna, sampling a received signal to produce a respective set of time domain samples;
   determining at least one coarse synchronization position;
   at each of the at least one receive antenna:
   a) for each of a plurality of candidate fine synchronization positions about one of said at least one coarse synchronization position:
      i) for each receive antenna positioning a fast Fourier transform (FFT) window to the candidate fine synchronization position and converting by FFT the time domain samples into a respective set of frequency domain components;
      ii) for each said at least one transmit antenna, extracting a respective received training sequence corresponding to the transmit antenna from the sets of frequency domain components;
      iii) for each transmit antenna, calculating a correlation between each respective received training sequence and a respective known transmit training sequence;
      iv) combining the correlations for the at least one transmit antennas to produce an overall correlation result for each candidate synchronization position;
   b) determining a fine synchronization position from the correlation values;
   using the fine synchronization position from each of the at least one receive antenna in an overall fine synchronization position.

2. A method according to claim 1 wherein a coarse synchronization position is determined for each receive antenna and used for determining the respective fine synchronization position.

3. A method according to claim 1 wherein a coarse synchronization position is determined for each receive antenna and an earliest of the coarse synchronization positions is used for determining the fine synchronization positions for all receive antennas.

4. A method according to claim 2 wherein the coarse synchronization position is determined in the time domain for at least one receive antenna by looking for a correlation peak between the time domain samples over two OFDM symbol durations.

5. The method of claim 1 wherein when the at least one receive antenna comprises at least two receive antennas, using the fine synchronization position from each of the at least two receive antennas in an overall fine synchronization position comprises combining the fine synchronization position from each of the at least two receive antennas in an overall fine synchronization position.

6. A method according to claim 5, wherein combining the fine synchronization positions from the at least two receive antennas in an overall fine synchronization position comprises selecting an earliest of the fine synchronization positions.

7. A method according to claim 1 wherein:
   sampling a received signal to produce a set of time domain samples is done for at least three OFDM symbol durations;
   determining at least one coarse synchronization position comprises performing a coarse synchronization in the time domain by looking for a correlation peak between the time domain samples received over two OFDM symbol durations to identify a coarse synchronization position by:
   a) calculating a plurality of correlation values, each correlation value being a correlation calculated between a first set of time domain samples received during a first period having one OFDM symbol duration and a second set of time domain samples received during a second period immediately following the first period and having one OFDM symbol duration, for each of a plurality of starting times for said first period;
   b) identifying the coarse synchronization position to be a maximum in said plurality of correlation values.

8. A method according to claim 1 wherein:
   combining the correlations for the at least one transmit antennas to produce an overall correlation result for each candidate synchronization position comprises multiplying together the correlations for the at least one transmit antenna for each candidate synchronization position.

9. A method according to claim 1 applied to a single transmit antenna single receive antenna system.

10. A method according to claim 1 wherein the training sequence is received on common synchronization channel sub-carriers.

11. A method according to claim 1 wherein the training sequence is received during an OFDM frame preamble.

12. A method according to claim 1 wherein the training sequence is received on dedicated pilot channel sub-carriers.

13. A method according to claim 12 wherein the training sequence is received during an OFDM frame preamble.

14. An orthogonal frequency division multiplexing (OFDM) receiver configured to communicate with a transmitter having at least one transmit antenna, the OFDM receiver comprising:

at least one receive antenna;

for each said at least one receive antenna, receive circuitry adapted to sample a received signal to produce a respective set of time domain samples;

a coarse synchronizer adapted to determine at least one coarse synchronization position;

a fine synchronizer comprising at least one fast Fourier transform (FFT) transformer, at least one correlator and at least one combiner, adapted to, at each of the at least one receive antenna:

a) for each of a plurality of candidate fine synchronization positions about one of said at least one coarse synchronization position:
  i) for each receive antenna position an FFT window to the candidate fine synchronization position and convert by FFT the time domain samples into a respective set of frequency domain components;
  ii) for each said at least one transmit antenna, extract a respective received training sequence corresponding to the transmit antenna from the sets of frequency domain components;
  iii) for each transmit antenna, calculate a correlation between each respective received training sequence and a respective known transmit training sequence;
  iv) combine the correlations for the at least one transmit antennas to produce an overall correlation result for each candidate synchronization position;
b) determine a fine synchronization position from the plurality of correlation values;

the receiver being further adapted to combine the fine synchronization positions from the at least one receive antenna in an overall fine synchronization position.

15. A receiver according to claim 14, wherein the at least one receive antenna is at least two receive antennas, the receiver adapted to combine the fine synchronization positions from the at least two receive antennas in an overall fine synchronization position by selecting an earliest of the fine synchronization positions.

16. A receiver according to claim 14 adapted to combine the correlations for the at least one transmit antennas to produce an overall correlation result for each candidate synchronization position by multiplying together the correlations for the at least one transmit antenna for each candidate synchronization position.

17. A receiver according to claim 14 adapted to receive the training sequence on common synchronization channel sub-carriers.

18. A receiver according to claim 14 adapted to receive the training sequence on dedicated pilot channel sub-carriers.

19. A method of performing synchronization at an orthogonal frequency division multiplexing (OFDM) receiver comprising:

at each of at least one receive antenna, sampling a received OFDM signal to produce a respective set of time domain samples, the received signal comprising a received training sequence;

performing synchronization based on correlations between the received training sequence and a local copy of the training sequence;

wherein performing synchronization based on correlations between the received training sequence and a local copy of the training sequence is done in the frequency domain, wherein the received training sequence is a frequency domain training sequence located on selected sub-carriers of the received OFDM signal, the OFDM receiver configured to communicate with a transmitter having at least one transmit antenna, wherein performing synchronization based on correlations between the received training sequence and a local copy of the training sequence in the frequency domain comprises:

at each of the at least one receive antenna:
a) for each of a plurality of candidate fine synchronization positions:
  i) positioning a fast Fourier transform (FFT) window to the candidate fine synchronization position and converting by FFT the time domain samples into a respective set of frequency domain components;
  ii) for each said at least one transmit antenna, extracting a respective received training sequence corresponding to the transmit antenna from the sets of frequency domain components;
  iii) for each transmit antenna, calculating a correlation between each respective received training sequence and a respective known transmit training sequence;
  iv) combining the correlations for the at least one transmit antennas to produce an overall correlation result for each candidate synchronization position;
b) determining a fine synchronization position from the plurality of correlation values.

20. The method of claim 19 wherein the at least one receive antenna comprises a plurality of receive antennas, the method further comprising:

combining the fine synchronization positions from the plurality of receive antennas in an overall fine synchronization position.

21. A method according to claim 20 wherein the training sequence is received on common synchronization channel sub-carriers.

22. A method according to claim 21 wherein another training sequence is received during an OFDM frame preamble.

23. A method according to claim 20 wherein another training sequence is received on dedicated pilot channel sub-carriers.

24. A method according to claim 23 wherein another training sequence is received during an OFDM frame preamble.

* * * * *

UNITED STATES PATENT AND TRADEMARK OFFICE
CERTIFICATE OF CORRECTION

| | | |
|---|---|---|
| PATENT NO. | : 8,018,975 B2 | Page 1 of 1 |
| APPLICATION NO. | : 11/529245 | |
| DATED | : September 13, 2011 | |
| INVENTOR(S) | : Jianglei Ma et al. | |

It is certified that error appears in the above-identified patent and that said Letters Patent is hereby corrected as shown below:

Title Page, Item (56), under the heading Foreign Patent Documents, the following two references should be added:
--WO   96/41452      12/1996
  GB   2 291 314    01/1996--;

Column 5, between lines 65 and 66, the following text was missing and should be added:
      --In some embodiments, combining the correlations for the at least one transmit antennas to produce an overall correlation result for each candidate synchronization position comprises multiplying together the correlations for the at least one transmit antenna for each candidate synchronization position.

In some embodiments, the method is applied to a single transmit antenna single receive antenna system.

In some embodiments, the training sequence is received on common synchronization channel sub-carriers.

In some embodiments, the training sequence is received during an OFDM frame preamble.

In some embodiments, the training sequence is received on dedicated pilot channel sub-carriers.

In some embodiments, the training sequence is received during an OFDM frame preamble.--

Column 7, line 17:
"...identified: selecting..." should be
--...identified:
      selecting...--.

Signed and Sealed this
Tenth Day of January, 2012

David J. Kappos
*Director of the United States Patent and Trademark Office*